(12) United States Patent
Pei et al.

(10) Patent No.: US 12,132,613 B2
(45) Date of Patent: Oct. 29, 2024

(54) ACCESS POINT VALIDATION FOR NETWORK CHANGE

(71) Applicant: Hewlett Packard Enterprise Development LP, Spring, TX (US)

(72) Inventors: Junyu Pei, Beijing (CN); Xiaohang Wei, Beijing (CN); Xiaoyang Fu, Beijing (CN); Kangchang Huang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 126 days.

(21) Appl. No.: 18/050,731

(22) Filed: Oct. 28, 2022

(65) Prior Publication Data

US 2024/0146608 A1    May 2, 2024

(51) Int. Cl.
*H04L 43/0817* (2022.01)
*H04L 41/0866* (2022.01)
*H04L 41/0869* (2022.01)
*H04L 41/0893* (2022.01)
*H04L 41/0894* (2022.01)
*H04L 43/55* (2022.01)
*H04W 12/06* (2021.01)
*H04W 48/20* (2009.01)

(52) U.S. Cl.
CPC ...... *H04L 41/0869* (2013.01); *H04L 41/0893* (2013.01); *H04L 41/0894* (2022.05)

(58) Field of Classification Search
CPC ............. H04L 41/0869; H04L 41/0894; H04L 41/0893
See application file for complete search history.

(56) References Cited

U.S. PATENT DOCUMENTS

| | | | |
|---|---|---|---|
| 6,522,881 B1 * | 2/2003 | Feder .................... | H04W 16/06 455/437 |
| 8,627,311 B2 * | 1/2014 | Auer ........................ | G06F 8/61 717/176 |
| 9,043,761 B2 * | 5/2015 | Artzi .................... | G06F 11/3688 717/124 |
| 9,544,798 B1 * | 1/2017 | Ahmadzadeh ...... | H04L 63/1408 |
| 10,462,015 B1 * | 10/2019 | Henry ..................... | H04L 43/50 |
| 10,693,901 B1 * | 6/2020 | Chan ...................... | H04L 67/02 |
| 10,795,719 B2 * | 10/2020 | Bull ..................... | G06F 16/2246 |

(Continued)

*Primary Examiner* — Chris Parry
*Assistant Examiner* — Hassan A Khan
(74) *Attorney, Agent, or Firm* — Hewlett Packard Enterprise Patent Department

(57) ABSTRACT

In implementations of the present disclosure, there is provided a method for access point (AP) validation. The method comprises detecting a trigger event for validating a network including a plurality of APs, and selecting a target AP from the plurality of APs based on a neighbor table of an AP associated with the detected trigger event. The method further comprises determining a validation case corresponding to the detected trigger event from a knowledge base. The method further comprises sending the validation case to the target AP, and, receiving a result of performance of the validation case from the target AP in response to the validation case being performed. Implementations of the present disclosure can validate whether the network change takes effect in the network automatically, and can improve the validation efficiency of the network changes.

20 Claims, 8 Drawing Sheets

(56) References Cited

U.S. PATENT DOCUMENTS

| | | | |
|---|---|---|---|
| 10,937,029 B2* | 3/2021 | Bull | G06F 9/547 |
| 2007/0019598 A1* | 1/2007 | Prehofer | H04W 36/0064 |
| | | | 455/436 |
| 2007/0097896 A1* | 5/2007 | Qi | H04L 12/66 |
| | | | 370/311 |
| 2008/0002651 A1* | 1/2008 | Nakano | H04K 3/28 |
| | | | 370/338 |
| 2009/0037431 A1* | 2/2009 | Martino | G06Q 30/02 |
| 2009/0232311 A1* | 9/2009 | Meier | H04L 63/062 |
| | | | 380/277 |
| 2009/0245163 A1* | 10/2009 | Inoue | H04W 24/04 |
| | | | 370/315 |
| 2009/0323555 A1* | 12/2009 | Lancaster | H04L 41/0806 |
| | | | 370/254 |
| 2012/0087281 A1* | 4/2012 | Rahman | H04W 8/005 |
| | | | 370/255 |
| 2012/0198438 A1* | 8/2012 | Auer | G06F 8/61 |
| | | | 717/176 |
| 2012/0311127 A1* | 12/2012 | Kandula | H04W 16/28 |
| | | | 709/224 |
| 2013/0318352 A1* | 11/2013 | Ichikawa | H04W 12/03 |
| | | | 713/168 |
| 2014/0003286 A1* | 1/2014 | Estevez | H04W 48/02 |
| | | | 370/254 |
| 2014/0098682 A1* | 4/2014 | Cao | H04W 36/008357 |
| | | | 370/252 |
| 2014/0269506 A1* | 9/2014 | Rolfe | H04W 8/00 |
| | | | 370/328 |
| 2014/0357299 A1* | 12/2014 | Xu | G06F 3/048 |
| | | | 455/456.2 |
| 2015/0139211 A1* | 5/2015 | Ji | H04W 12/122 |
| | | | 370/338 |
| 2016/0142925 A1* | 5/2016 | Pang | H04W 24/02 |
| | | | 370/331 |
| 2016/0192136 A1* | 6/2016 | Pan | H04W 64/006 |
| | | | 455/456.1 |
| 2018/0063714 A1* | 3/2018 | Stephenson | H04L 63/083 |
| 2018/0102883 A1* | 4/2018 | Amini | H04W 4/30 |
| 2018/0338278 A1* | 11/2018 | Ketonen | H04W 48/20 |
| 2019/0097695 A1* | 3/2019 | Patwardhan | H04B 7/0456 |
| 2019/0313265 A1* | 10/2019 | Yamamoto | H04W 24/04 |
| 2020/0027096 A1* | 1/2020 | Cooner | G06Q 40/04 |
| 2020/0162425 A1* | 5/2020 | Vasseur | H04L 41/40 |
| 2020/0244517 A1* | 7/2020 | Prasad | H04L 41/0668 |
| 2020/0245212 A1* | 7/2020 | Jia | H04L 41/0663 |
| 2021/0256487 A1* | 8/2021 | Johnson | G06Q 30/0601 |
| 2022/0182944 A1* | 6/2022 | Sevindik | H04W 16/14 |
| 2022/0225231 A1* | 7/2022 | Pei | H04W 76/27 |
| 2023/0370952 A1* | 11/2023 | Changlani | H04W 48/10 |
| 2024/0040430 A1* | 2/2024 | Zeng | H04W 28/0278 |
| 2024/0073792 A1* | 2/2024 | Patil | H04W 48/12 |
| 2024/0114355 A1* | 4/2024 | Sathe | H04W 24/02 |

* cited by examiner

ACCESS POINT VALIDATION FOR NETWORK CHANGE

BACKGROUND

With the development of hardware and software, information technology (IT) enterprises and networking providers are facing new challenges to deliver a better user experience to customers and clients. To provide a consistent level of performance, 7/24 monitoring solutions can proactively improve real-world user experiences. It continuously tests network and connectivity performance in some locations, such as office spaces, meeting areas, and other types of public places.

Customizable test scripts and easy-to-deploy sensors are required to help ensure that any wireless and wired network can handle the influx of mobile and internet of things (IoT) devices, while delivering the application responsiveness needed for free access. Such a validator which carried the test scripts plays an important role in helping build an intelligent and robust system. Every change needs to be validated to make sure that there is nothing broken.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Figure 1:
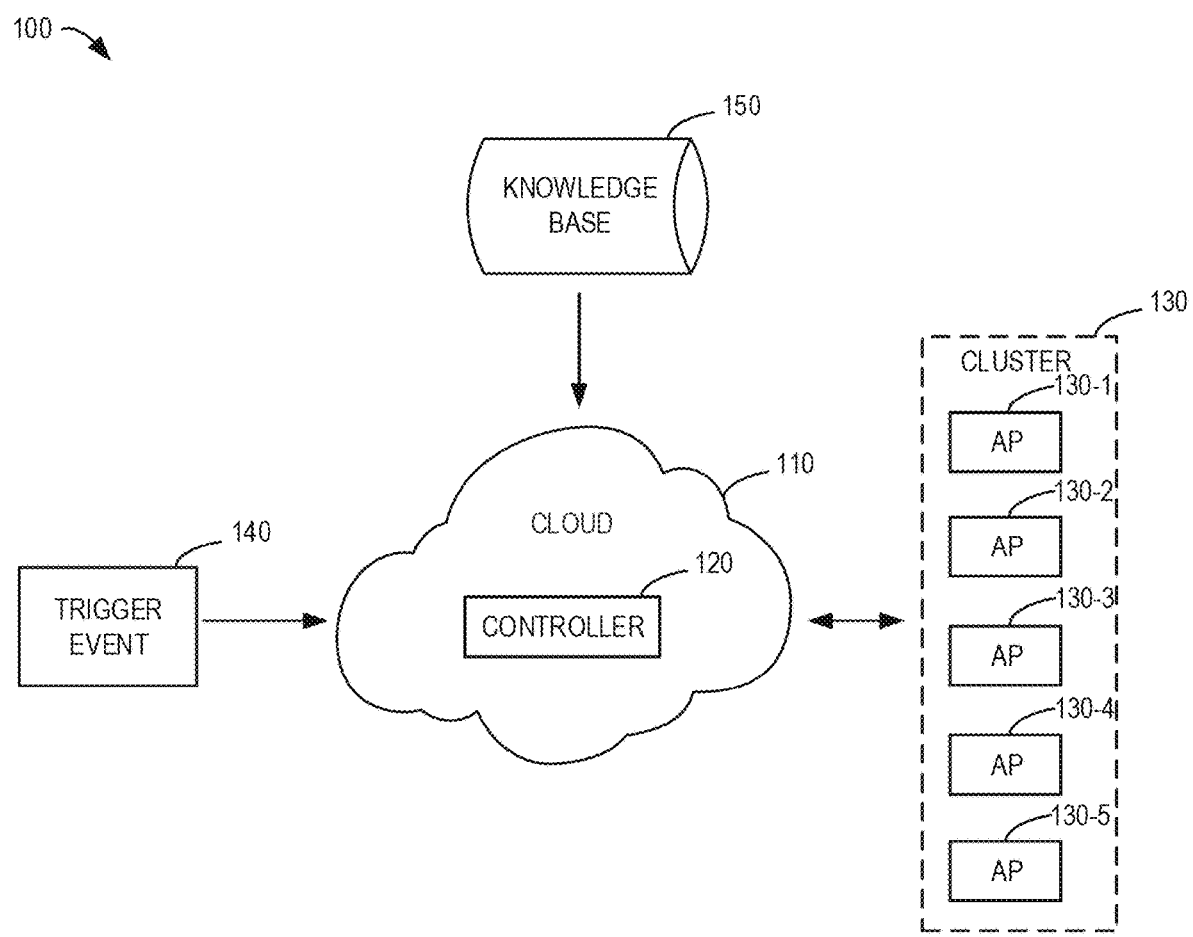
FIG. 1 illustrates a block diagram of an example environment in which example implementations of the present disclosure may be implemented.

Traditional monitoring solutions for APs perform 7/24 active monitoring on APs in the network, and it needs to deploy a lot of sensors for monitoring. Cloud-based data processing and a web-based administrative dashboard may be accessed from anywhere to view the result of the monitoring. Traditional monitoring solutions may not validate some Wi-Fi specific features such as beacon or roaming, and it requires the client to set up the test for monitoring these features.

As discussed above, although traditional monitoring solutions may perform 7/24 active monitoring on APs in the network, it is expensive to deploy for enterprises. Moreover, it also needs time to deploy these devices and sensors, and thus it is time-consuming as well. The cost of human resources should also be taken into consideration because when using traditional AP monitoring solutions, test cases for different APs in different scenarios are determined individually. At least for these reasons, traditional AP monitoring solutions may take too much time to set up all the test cases. If any network environment changes, the test cases need to be set up again.

Therefore, it can be seen that traditional monitoring solutions for APs have several problems. First, traditional AP monitoring solutions need extra deployment. For example, the sensors should be placed at the same height where user devices are placed or held so as to run accurate simulated tests over Wi-Fi or Ethernet connections. Installation of these sensors for extremely remote locations may be difficult. Second, test cases need to be set up in advance and individually for different APs in different scenarios. Tests may be set up for network access, authentication, captive portal response, cloud applications, and internal applications. For example, in the scenario of broadcasting messages, test cases should be set up for every AP in the network. Third, because of the above-mentioned second problem, the new configuration may not be monitored. For example, if a new IoT beacon is added to the network, corresponding test cases should be modified accordingly in order to monitor the newly added beacon.

Therefore, implementations of the present disclosure propose a solution of an AP validation for a network change. The proposed solution may be implemented by a controller of a cloud, and the controller may be called an AP validator. According to implementations of the present disclosure, after a trigger event (for example, a configuration change) is detected, the controller obtains the corresponding validation case(s) and sends the case(s) to a target AP for validation. It may also provide a feedback indicating whether the network change takes effect; for example, the changed network works as what it is expected.

Implementations of the present disclosure may use the existing AP(s) in the network to validate the network change, and thus it does not need extra deployment either. Implementations of the present disclosure may be applied to the production environment without any change, so it is cost-effective. Meantime, the AP will send back the result of the performance of the validation cases, and thus the updated situations of the changed network will be known. To better leverage the existing AP to validate the network change, the present disclosure provides a knowledge base which stores highly optimized test cases corresponding to various trigger events. Each trigger event is mapped to a case or a suite of cases based on the expert experience. Since the cases in the knowledge base are highly optimized by engineers, implementations of the present disclosure can resolve the network issues with expert experiences without user perception.

Other advantages of implementations of the present disclosure will be described with reference to the example implementation as described below. Reference is made below to FIG. 1 through FIG. 8 to illustrate basic principles and several example implementations of the present disclosure herein.

FIG. 1 illustrates a block diagram of an example environment 100 in which example implementations of the present disclosure may be implemented. As shown in FIG. 1, in the environment 100, there is a cloud 110 that may include a group of cloud servers. By providing Infrastructure-as-a-Service (IaaS) via the internet or dedicated network connection, the cloud 110 allows enterprises to access computing power on-demand while no longer needing to worry about the underlying infrastructure. The cloud 110 enables enterprises to scale rapidly while reducing the cost of provisioning computing power.

Continue to refer to FIG. 1, a controller 120 is implemented in the cloud 110, and the controller 120 may be a computer program for AP validation. The role of the controller 120 is to remotely receive data (such as trigger event 140) from the network, and determine the corresponding test strategy (such validation cases). Once the validation cases are determined, the validation cases will be sent to a target AP (also called a candidate AP) for performing these validation cases. The controller 120 may receive a result of a performance of the validation cases. Depending on the result, the controller 120 may determine whether the change takes effect in the network. If there is something wrong or abnormal, an alert may be sent automatically to an administrator by the controller 120.

The trigger event 140 may include a variety of network changes. Example types of trigger events may include a configuration change, a firmware upgrade and a topology change. Example types of configuration changes may include a service set identifier (SSID) change and an IoT beacon change.

In the environment 100, there is an AP cluster 130 including a plurality of APs. The plurality of APs in the network may be used to provide wireless network connectivity. As shown in FIG. 1, five APs (such as AP 130-1, AP 130-2, AP 130-3, AP 130-4, and AP 130-5) are grouped as the AP cluster 130. It is noted that the AP cluster 130 is only an example, and there may be more APs or more AP clusters in the environment 100.

As shown in FIG. 1, there is a knowledge base 150 in the environment 100. The knowledge base 150 may be communicatively connected to the cloud 110 or controller 120. In some implementations, the knowledge base 150 may be part of the cloud 110, and the knowledge base 150 may store different validation cases. The validation case may be mapped to a respective trigger event 140. Several related test cases may be combined into a suite of validation cases, and the suite of validation cases may be used to validate the same or relative network changes. In some implementations, the validation cases may be designed and optimized by expert engineers of the network device vendor.

Figure 2:
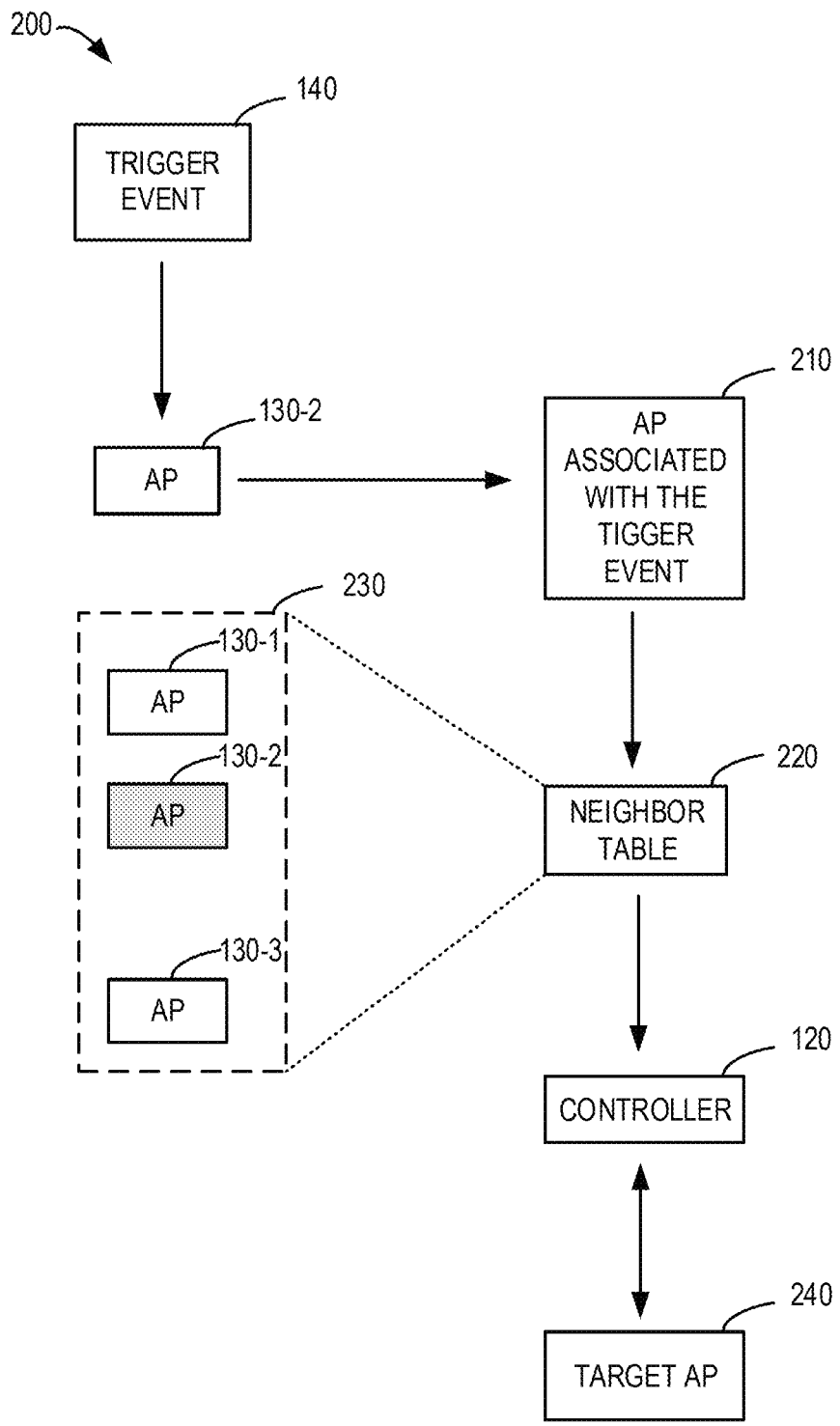
FIG. 2 illustrates a block diagram of selecting a target access point (AP) from a plurality of APs based on a neighbor table of an AP associated with the trigger event according to implementations of the present disclosure.

FIG. 2 illustrates a block diagram 200 of selecting a target AP from a plurality of APs based on a neighbor table of an AP associated with the trigger event according to implementations of the present disclosure. As shown in FIG. 2, after the trigger event 140 occurred, the controller 120 may receive a message of the trigger event 140. In this example, the trigger event 140 may be a SSID change of the AP 130-2. Thus, AP 130-2 may be determined to be AP 210, which is associated with the trigger event 140.

As shown in FIG. 2, the controller 120 may obtain a neighbor table 220 of AP 130-2. The neighbor table 220 may include information that indicating AP's location and their neighbor relationship and helping locate APs and plan the wireless network. A neighbor table can help each AP to keep track of neighboring (adjacent) routers. When a new neighbor is learned, the address and interface is recorded into the neighbor table. After the controller 120 obtains the neighbor table 220, the controller 120 may select an AP to be the target AP to perform the validation case.

One of an example neighbor table 220 is shown in dashed block 230. As shown in 230, the AP 130-2 has two neighbor APs, the AP 130-1 and the AP 130-2. In some implementations, the selection of the target AP may be based on the nearest AP. For example, the AP 130-1 is the nearest AP to the AP 130-2, and the AP 130-1 is selected as the target AP 240.

In some implementations, the selection of the target AP may be based on a neighbor AP with the least workload in a plurality of neighbor APs. For example, the controller 120 may obtain the workloads of the neighbor AP 130-1 and AP 130-3. If the AP 130-3's workload is lower than the AP 130-1's workload, then AP 130-3 may be selected by the controller 120 as the target AP 240. Alternatively, if the AP 130-1's workload is lower than the AP 130-3's workload, then the AP 130-1 may be selected by the controller 120 as the target AP 240. Since the APs in the network may have different working conditions and different workloads, two mechanisms to select the target AP provide flexibility and easy adaption to the network and APs.

Figure 3:
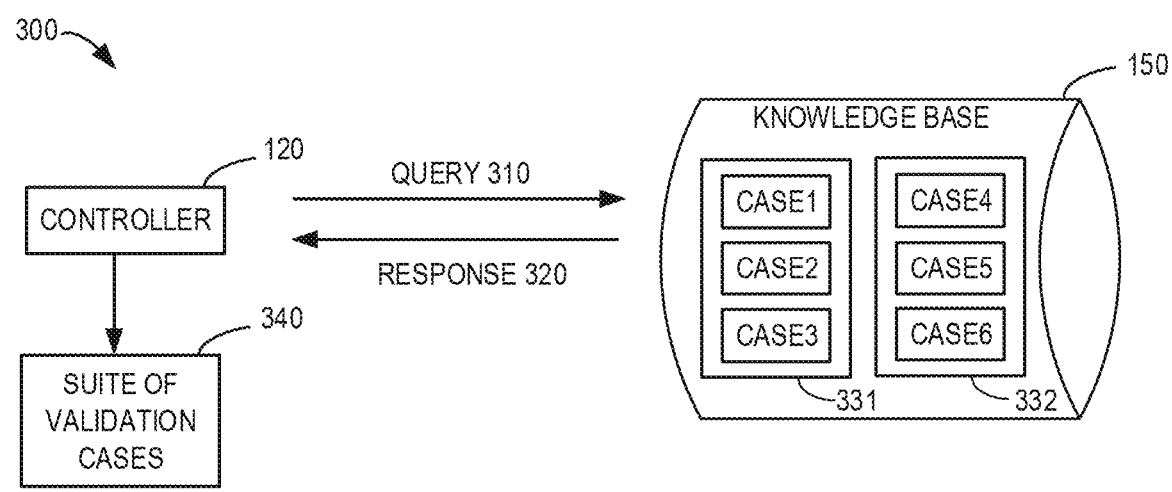
FIG. 3 illustrates a block diagram of determining the validation case(s) corresponding to the trigger event from the knowledge base according to implementations of the present disclosure.

FIG. 3 illustrates a block diagram 300 of determining the validation case(s) corresponding to the trigger event from the knowledge base according to implementations of the present disclosure. As shown by FIG. 3, the controller 120 may obtain the trigger event 140, and send a query 310 of the trigger event 140 to the knowledge base 150. Based on the query 310, the knowledge base 150 may be retrieved to obtain the corresponding validation cases. The knowledge base 150 may send back a response 320 to the controller 120. The controller 120 may determine the validation case or the suite of validation cases based on the response 320.

An example internal structure of the knowledge base 150 is shown in FIG. 3, and the knowledge base 150 may have several suites of validation cases, for example suite 331 and suite 332. Each suite may include several validation cases, and the cases in one suite may be corresponding to one type of trigger events.

In some implementations, the query 310 may include an index. For example, index A refers to a configuration change, and index B refers to a firmware upgrade. In some implementations, the query 310 may include some detailed information about the trigger event. In some implementations, the response 320 may include indexes regarding the validation cases, and the controller 120 may determine the corresponding cases based on respective indexes. In some implementations, the response 320 may include the suite of validation cases corresponding to the trigger event 140, and then the controller 120 may determine the validation case directly.

Figure 4:
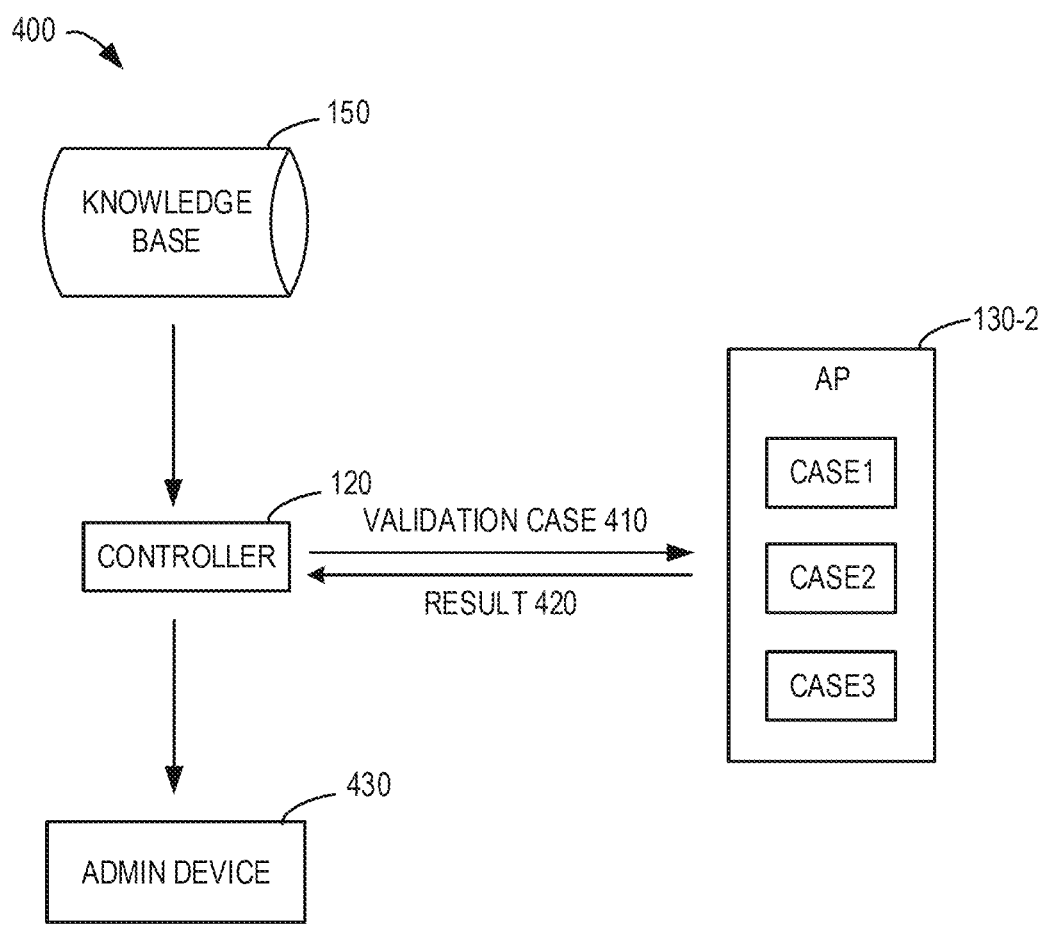
FIG. 4 illustrates a block diagram of determining whether the network change takes effect based on a result of a performance of the validation case according to implementations of the present disclosure.

FIG. 4 illustrates a block diagram 400 of determining whether the network change takes effect based on a result of a performance of the validation case(s) according to implementations of the present disclosure. The trigger event 140 may be directed to an AP. For example, an SSID of the AP 130-1 is changed, and then the trigger event 140 is directed to the AP 130-1. The AP 130-2 is the nearest neighbor AP to the AP 130-1, and thus AP 130-2 may be selected as the target AP.

Sequentially or in parallel, the controller 120 may determine a validation case(s) 410 (or a suite of validation cases) corresponding to the trigger event 140 from the knowledge base 150. The controller 120 may send the validation case 410 to the target AP (in this case, the AP 130-2). The AP 130-2 may perform the validation case 210 and may send back a result 420 of the performance of the validation case to the controller 120.

In some implementations, the validation case may be performed by the target AP to validate a function of the AP associated with the detected trigger event. The controller 120 may determine whether the detected trigger event takes effect in the network based on the result of performance of the validation case. As an example, the SSID of the AP 130-2 has changed. The target AP 130-3 may receive the suite of validation cases and may perform the suite of validation cases to validate whether the SSID of AP 130-2 has changed. In this way, the controller may find out the issues by performing the validation cases automatically. Before the customers notice the network issues, the engineers may already fix the issues, and thus satisfaction of customer experience can be increased.

In some implementations, the controller 120 may determine whether the detected trigger event takes effect in the network based on the result of performance of the validation case 410. In some implementations, the result 420 may indicate a success of the validation case 410, which means the changed network works fine and everything is as expected.

In some implementations, the determined suite of cases may include several cases, such as case 1, case 2, and case 3 as shown in FIG. 4. These validation cases are used to validate the changed part of the network or APs affected by the trigger event 140. As an example, assuming the trigger event is that AP 130-1 broadcasts a message '123456'. Case 1 may be sent to the AP 130-2 (AP 130-1's neighbor AP) to monitor if the message broadcast by the AP 130-1 is 123456. Case 2 may be to validate if the AP 130-3 can hear the message '123456', which is broadcast by AP 130-1.

In some implementations, the result 420 may indicate that the changed network does not work as expect. In this case, the controller 120 may send an alert associated with trigger event 140 to an administrator device 430. An administrator who is using the administrator device 430 may take next actions to figure out the issues. The validation cases or the suite of cases are dedicated to the trigger event, and these validation cases are mapped to the changed part of the network and are highly optimized. It may take less effort to perform the validation cases but achieve better validation results and time efficiency. In another aspect, different from traditional monitoring solutions, these validation cases are prepared by expert engineers, and thus it is more competitive and saves the user's time and effort.

Figure 5:
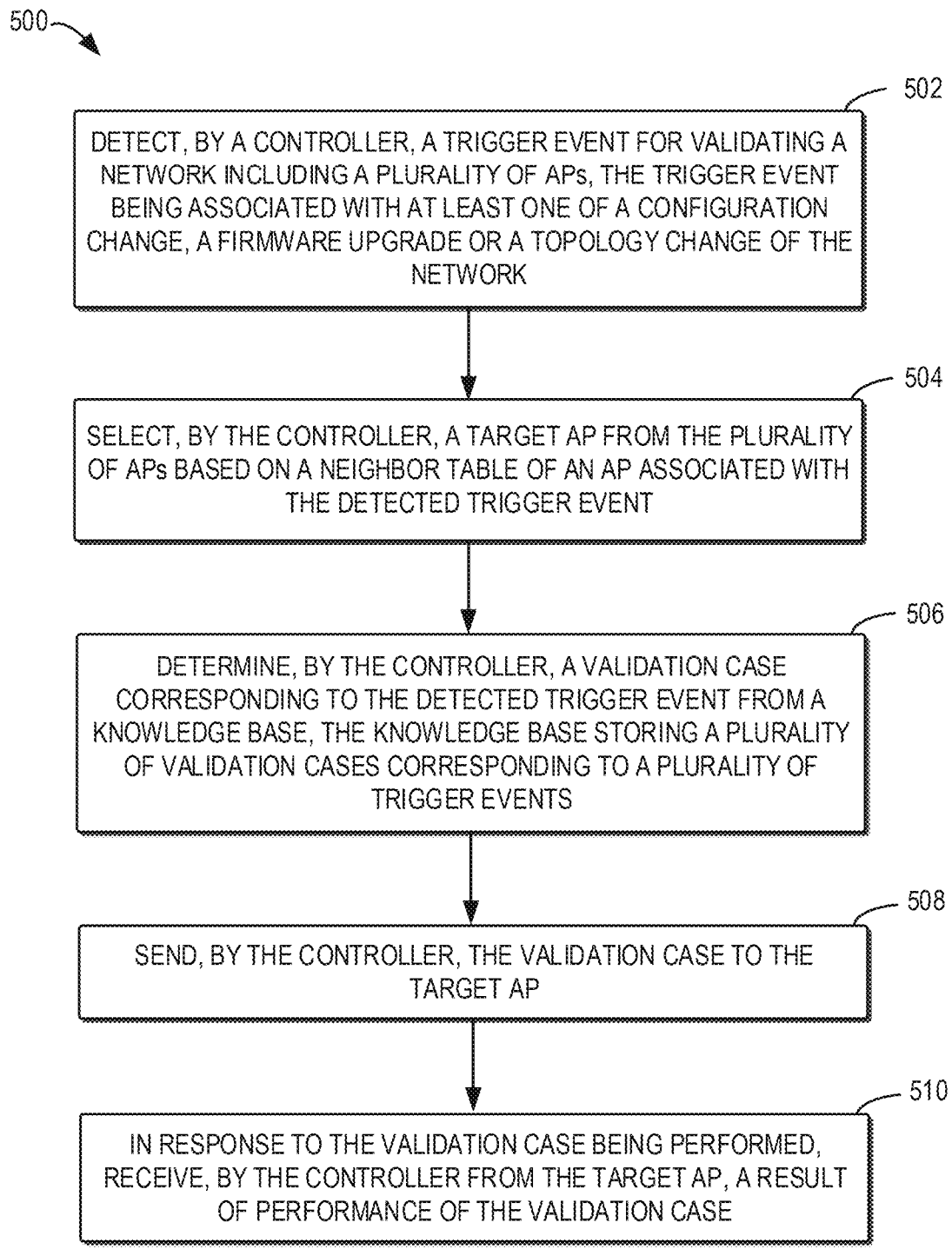
FIG. 5 illustrates a flow chart of an example validation method according to implementations of the present disclosure.

FIG. 5 illustrates a flow chart of an example validation method 500 according to implementations of the present disclosure. At 502, a controller detects a trigger event for validating a network including a plurality of access points APs. For example, the controller 120 detects a trigger event 140, and the trigger event 140 is associated with at least one of a configuration change, a firmware upgrade, or a topology change of the network. As an example, the trigger event 140 is associated with is an SSID change, which belongs to a network change.

At 504, the controller selects a target AP from the plurality of APs based on a neighbor table of an AP associated with the detected trigger event. As an example, the trigger event 140 occurred in AP 130-2, and thus AP 130-2 is the AP associated with the detected trigger event 140. The controller 120 selects the AP 130-3 as the target AP based on the neighbor table of the AP 130-2.

At 506, the controller determines a validation case corresponding to the detected trigger event from a knowledge base, wherein the knowledge base stores a plurality of validation cases corresponding to a plurality of trigger events. For example, the controller 120 determines a suite of validation cases 340 corresponding to the trigger event 140 from the knowledge base 150.

At 508, the controller sends the validation case to the target AP. As an example, the controller 120 sends the suite of validation cases 340 to the target AP 130-3, and the target AP 130-3 performs the validation case for validating the network change.

At 510, after the validation case is performed, the controller receives a result of performance of the validation case from the target AP. As an example, the controller 120 receives from the target AP 130-3 the result of performance of the suit of validation cases 340, and the controller can verify whether the network change takes effect based on the result of the performance of the suit of validation cases 340.

In this way, the method 500 can help to build an intelligent and robust system because APs have more coverage on networking and APs have more powerful computing capability. Meanwhile, the method 500 provides a feedback result on the performance of the validation cases, and thus if the network change does not take effect, the controller would know the situation of the network or AP(s).

Figure 6:
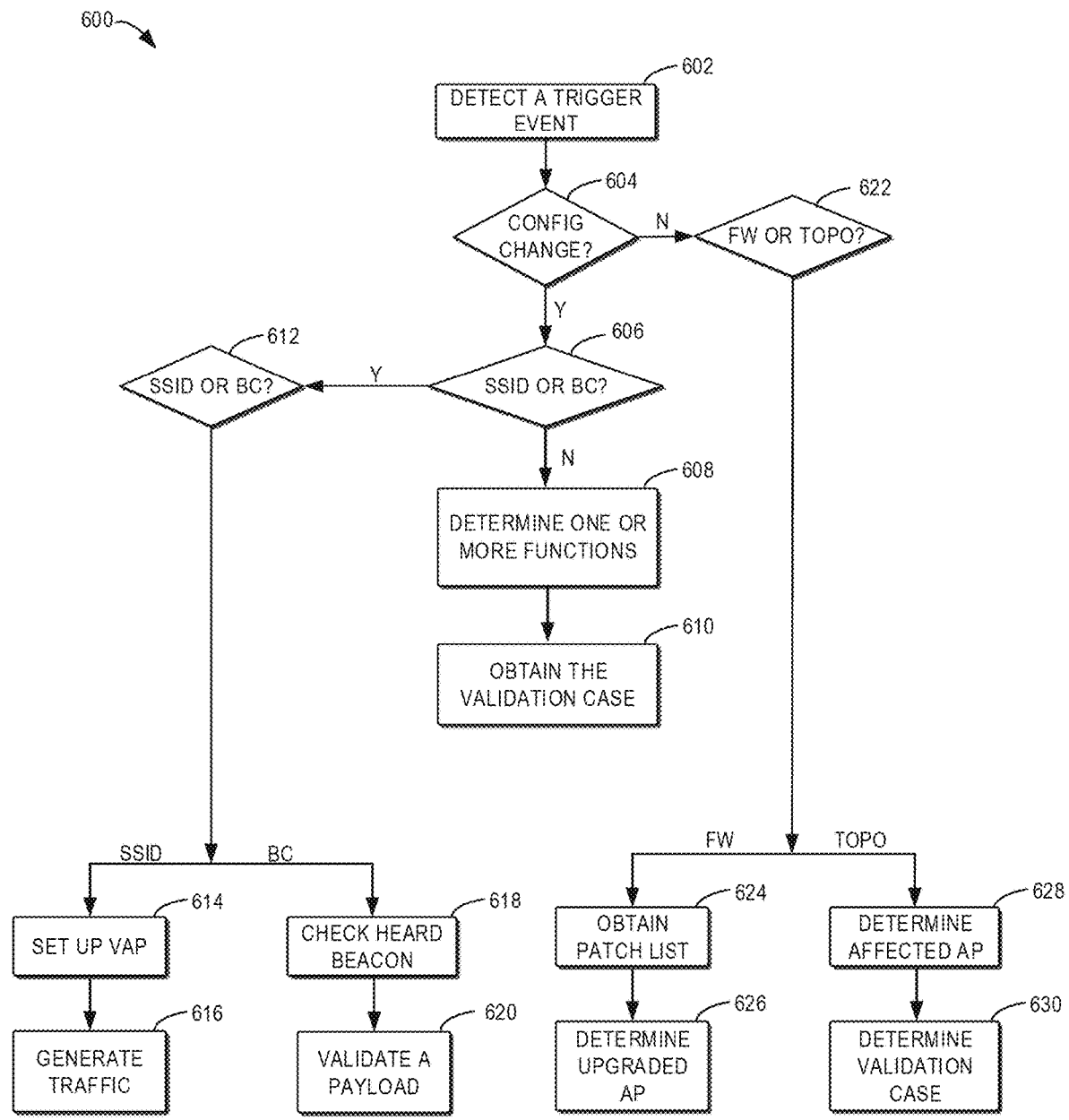
FIG. 6 illustrates a flow chart of an example method for validating different trigger events according to implementations of the present disclosure.

FIG. 6 illustrates a flow chart of an example method 600 for validating different detected trigger events according to implementations of the present disclosure. At 602, the controller 120 may detect the trigger event 140. At 604, the controller 120 may determine whether the trigger event 140 is related to configuration change (CONFIG). If the trigger event 140 is configuration change, then the method 600 continues to 606, otherwise the method 600 continues to 622.

At 606, the controller 120 may determine whether the configuration change is an SSID change or an IoT beacon change (BC). If the configuration change is neither the SSID change nor the IoT beacon change, the method 600 continues to 608. If the configuration change is either the SSID change or the IoT beacon change, the method 600 continues to 612.

At 608, if the trigger event is a configuration change, the controller 120 may determine one or more functions of the network affected by the configuration change. At 610, the controller 120 may obtain the validation case for validating the one or more functions of the network. As an example, the configuration change may be configuration change of AP 130-1, where the broadcast message is changed from '123456' to '456789'. The controller 120 may determine that there's only one changed part of the network, which is the heard message from the AP 130-1. The controller 120 may send corresponding validation cases to the target AP to verify if the broadcast message from the AP 130-1 is changed from '123456' to '456789'. In some implementations, the controller 120 may send the validation cases to other APs iteratively to help to confirm the changed message broadcast from AP 130-1 is received as it should be. Thus, the effectiveness of the configuration change can be verified by the whole APs in the network.

As such, the changed part due to the affection of the trigger event may be validated to check out if the changed network works fine and as expect. In this way, the validation of the changed part can save the computing overhead and time. Moreover, implementations of the present disclosure are performed based on the triggered event. That is, if no event is triggered, there is no need to perform the validation cases, which saves energy and lifetime of corresponding devices.

At 612, the controller 120 may determine whether the configuration change is the SSID change or the IoT beacon change. If the configuration change is the SSID change, the method 600 continues to 614. If the configuration change is the IoT beacon change, the method 600 continues to 618.

At 614, the controller 120 may cause the target AP to set up a Wi-Fi station virtual AP (VAP) for connecting to a neighbor basic SSID (BSSID). At 616, the controller 120 may cause the target AP to generate traffic for validating a function of the neighbor BSSID. As an example, the controller 120 may fetch the suite of validation cases according to the new SSID configuration. The controller 120 may send instructions to perform the suite of validation cases to the target AP. It is noted that the instructions may be a script or scripts that may be executed by APs, such as Lua scripts, Python scripts, etc. The target AP may receive the instructions and set up a Wi-Fi station VAP to connect to the neighbor BSSID. During the performing of the validation cases, the target AP may act like a station, and generate some traffic to validate the function of the target BSSID. In some implementations, the controller 120 may arrange this process to iterate the whole cluster of APs or the network. After the validation, the controller 120 may tear down the Wi-Fi station VAP.

At 618, the controller 120 may cause the target AP to check a heard IoT beacon. At 620, the controller 120 may cause the target AP to validate a payload of the heard IoT beacon. As an example, the controller 120 may fetch the suite of cases corresponding to the IoT configuration. The controller 120 may send the instructions to the target AP, and the target AP may check out the heard beacon and verifies the payload of the heard beacon. In some implementations, the controller 120 may arrange this process to iterate the whole cluster of APs or the network. In some implementations, the beacon payload may be a JSON format. In some implementations, the beacon payload parameters may describe gateway MAC address which received the beacon packet, IoT AP IP, IoT AP model, IoT AP image version, IoT AP serial number and so forth.

Continue to refer to FIG. 6, at 622, the controller 120 may determine if the trigger event is a firmware upgrade (FW) or a topology change (TOPO). If the configuration change is the firmware upgrade, the method 600 continues to 624. If the configuration change is the topology change, the method 600 continues to 628.

At 624, if the detected trigger event is the firmware upgrade, the controller 120 may obtain a patch list of the firmware upgrade. At 626, the controller 120 may determine an upgraded AP in the network and the validation case according to the patch list for validating one or more functions of the upgraded AP.

In some implementations, the patch list may be used to create customized patch reports to obtain patching intelligence, make smart patch decisions, report patch compliance, and communicate the risks. The patch list may indicate patches associated with a specific task. For example, a patch may belong to one of the following types: security—a software change to address vulnerability; service pack—a patch to installed software; a collection of updates, fixes, or enhancements delivered in a single installable package; audit—a type of BigFix patch used to detect conditions that may not be remediated and require the attention of an administrator; enhancement—a change that provides new features; bug fix—a change that fixes one or more bugs; configuration—a change that addresses a configuration issue.

As such, after the controller 120 obtains the patch list, the controller 120 may determine the upgraded AP in the network, and the controller 120 may also determine the validation case according to the patch list for validating one or more functions of the upgraded AP. The controller 120 then may send instructions to the target AP to performing the validation cases. In some implementations, the controller 120 may arrange this process to iterate the whole cluster of APs or the network.

At 628, if the detected trigger event is the topology change, the controller 120 may determine one or more APs affected by the topology change. At 630, the controller 120 may the validation case for validating one or more functions of the one or more APs.

As an example, after the network topology change may be detected by the controller 120, the controller 120 may pick a target AP according to the neighbor table of the changed AP. The controller 120 may fetch the suite of cases to validate the affected AP, and send the instructions to the target AP for performing the validation cases. In some implementations, the controller 120 may arrange this process to iterate the whole cluster of APs or the network.

The validation method 600 is based on the knowledge from expert engineers, and thus the validation cases may be automatically tested without any user input. By way of this mechanism, the validation is no perception for users, and the controller also holds the information about the updated network situation.

Figure 7:
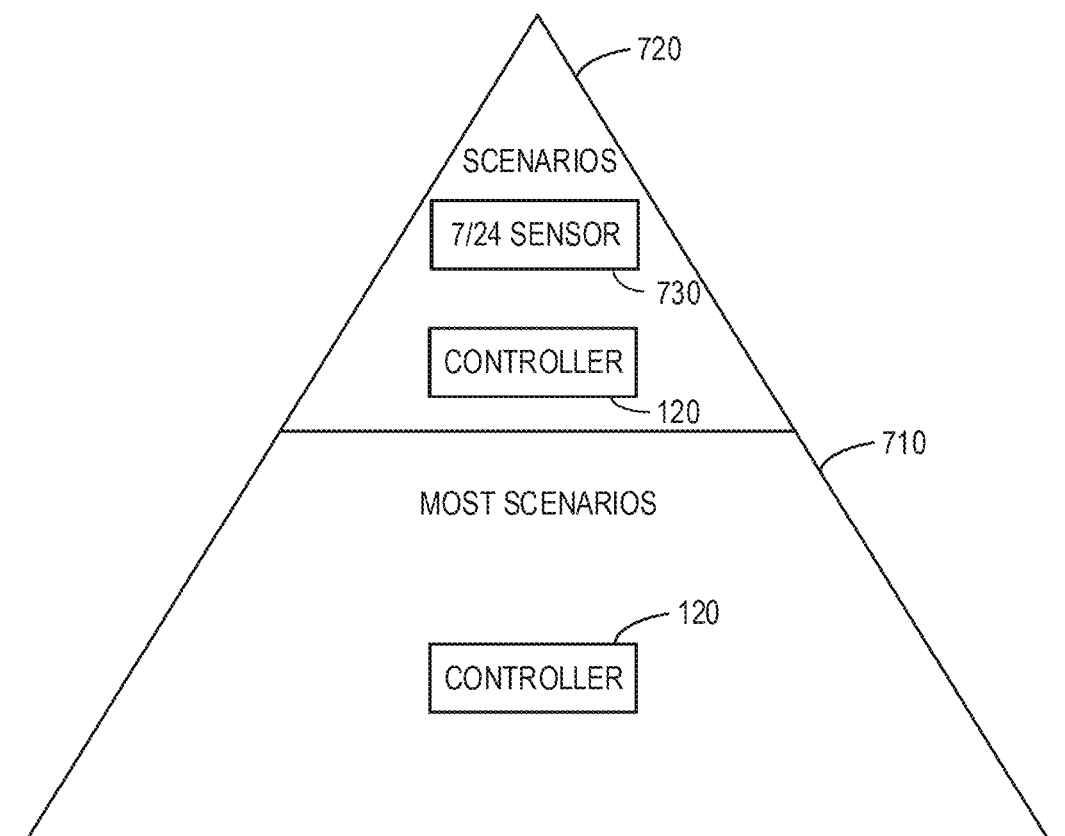
FIG. 7 illustrates a block diagram of example scenarios in which example implementations of the present disclosure may be implemented.

FIG. 7 illustrates a block diagram of example scenarios in which example implementations of the present disclosure may be implemented. As shown, for the most scenarios 710, they are applicable for only using of the controller 120 for AP validation according to the method of implementations of the present disclosure. For example, the scenarios 710 may include extensive test suites for Wi-Fi, LAN, DHCP, DNS, authentication, captive portals, IoT beacon addition, and roaming.

For other scenarios 720, it may need a combination of using of the controller 120 for AP validation and traditional 7/24 monitoring sensors 730. For example, the scenarios 720 include dashboard with detailed diagnostics and insights, and alert integration with email, SMS, Slack. These scenarios 720 take a small percentage of all scenarios. Therefore, the controller for AP validation may be used for most situations of network monitoring. In addition, implementations of the present disclosure may be combined with other solutions in other scenarios.

Figure 8:
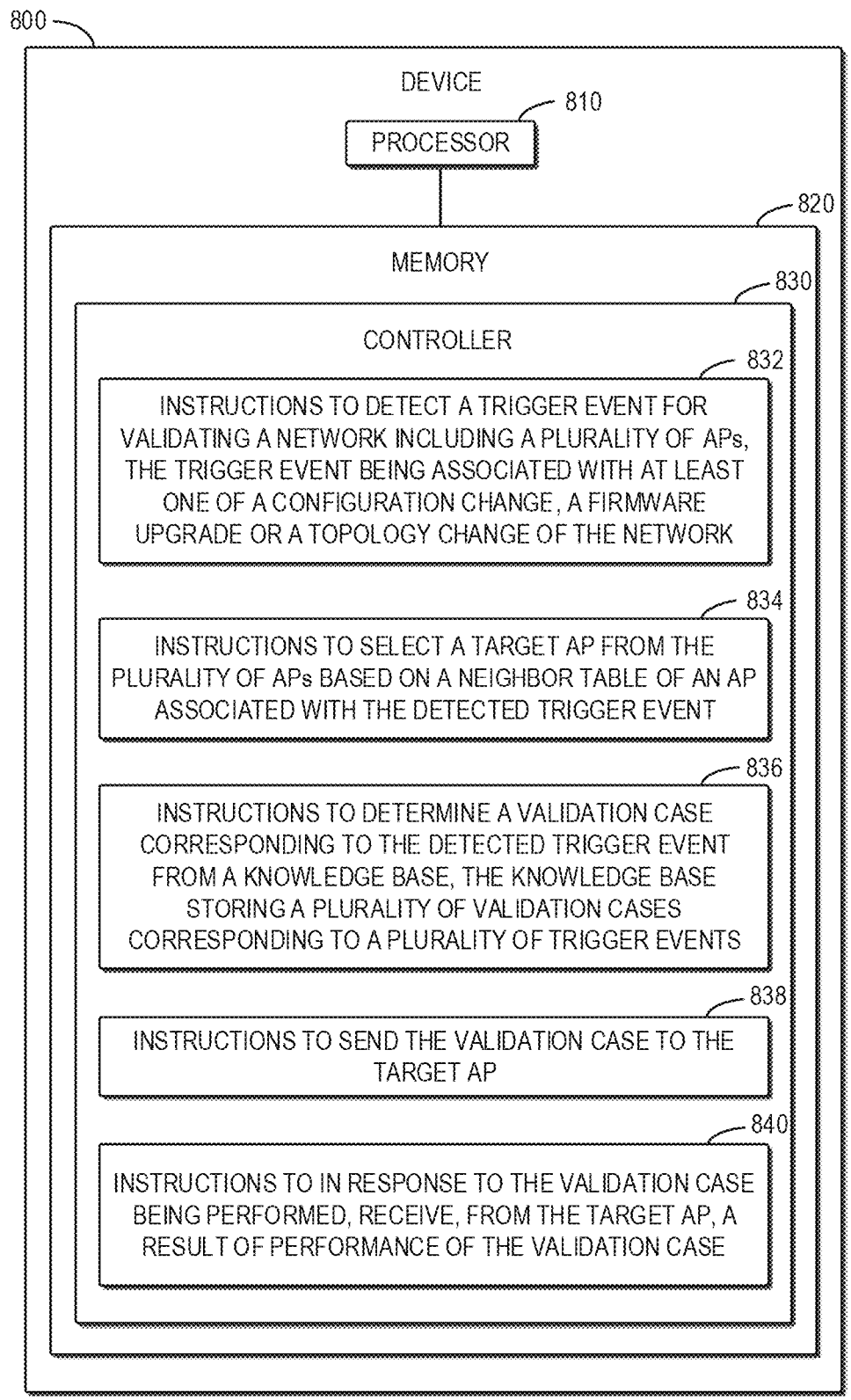
FIG. 8 illustrates an example device according to implementations of the present disclosure.

FIG. 8 illustrates an example device 800 according to implementations of the present disclosure. As shown in FIG. 8, the device 800 comprises at least one processor 810 and a memory 820 coupled to the processor 810. The memory 820 stores a controller 830 comprising instructions 832, 834, 836, 838, and 840 to cause the processor 810 to perform actions according to implementations of the present disclosure.

As shown in FIG. 8, in some implementations, the controller 830 may comprise a portion of scripts or codes written in a certain computer language. The instructions 832, 834, 836, 838, and 840 may also be written in the certain computer language. The controller 830 (and the instructions included in it) may be implemented by a cloud or a cloud server (such as the cloud 110). In some other implementations (not shown), the controller 830 may be an individual electronic device, such as an AP controller, which is deployed close to a production environment.

The detailed implementations will now be described with reference to FIG. 1 to FIG. 4, FIG. 6, and FIG. 8. As shown in FIG. 8, the controller 830 comprises instructions 832 to detect a trigger event for validating a network including a plurality of APs, and the trigger event is associated with at least one of a configuration change, a firmware upgrade or a topology change of the network. As an example, the instructions 832 are executed by the processor 810, and the processor 810 causes the controller 830 to detect a trigger event 140.

In some implementations, the trigger event 140 may be one or more of a configuration change, a firmware upgrade, or a topology change of the network. In some implementations, the configuration change may comprise a SSID change or an IoT beacon change. In some implementations, the trigger event 140 is detected by the controller 830, and while in other implementations, the trigger event 140 may be a user input. For example, the trigger event 140 may be a change of SSID of AP 130-1 per the user's input.

The controller 830 further comprises instructions 834 to select a target AP from the plurality of APs based on a neighbor table of an AP associated with the detected trigger event. As an example, the instructions 834 are executed by the processor 810, and the processor 810 causes the controller 830 to select a target AP among AP 130-1, AP 130-2, AP 130-3, AP 130-4, and AP 130-5. This selection may be based on two conditions. One of the two conditions is to select the target AP according to the nearest AP to the AP associated with the trigger event 140. For example, if the AP 130-2 is the AP associated with the trigger event 140, and the AP 130-3 is the nearest AP to the AP 130-2, and the AP 130-3 is selected as the target AP 240.

Another one of the two conditions is to select the target AP according to a neighbor AP with the least workload in a plurality of neighbor APs. For example, if the AP 130-2 is the AP associated with the trigger event 140, the controller 830 may obtain the workloads of the neighbor AP 130-1 and AP 130-3. If the AP 130-3's workload is lower than the AP 130-1's workload, the controller 830 selects AP 130-3 as the target AP 240. Alternatively, if the AP 130-1's workload is lower than the AP 130-3's workload, the controller 830 selects the AP 130-1 as the target AP 240.

As shown in FIG. 8, the controller 830 further comprises instructions 836 to determine a validation case corresponding to the detected trigger event from a knowledge base, and the knowledge base stores a plurality of validation cases corresponding to a plurality of trigger events. As an example, the instructions 836 are executed by the processor 810, and the processor 810 causes the controller 830 to determine a suite of validation cases 340 corresponding to the detected trigger event 140 from a knowledge base 150. In some implementations, the validation case(s) may be determined by sending a query 310 to the knowledge base 150 and receiving a response 320 to the query 310.

The controller 830 further comprises instructions 838 to send the validation case to the target AP. As an example, the instructions 838 are executed by the processor 810, and the processor 810 causes the controller 830 to send the suite of validation cases 340 to the target AP 130-3. When the target AP 130-3 receives the suite of validation cases 340, the target AP 130-3 may perform these cases to validate the working situations of the corresponding AP and the working situations of the network as well.

As shown in FIG. 8, the controller 830 further comprises instructions 840 in response to the validation case performed, receiving a result of performance of the validation case from the target AP. As an example, the instructions 840 are executed by the processor 810, and the processor 810 causes the controller 830 to receive from the target AP 130-3 the result of performance of the suit of validation cases 340, and the controller 830 may verify whether the network change takes effect based on the result of the performance of the suit of validation cases 340.

In some implementations, the controller 830 may be caused to by executing additional instructions to determine whether the detected trigger event takes effect in the network based on the result of performance of the validation case 410. In some implementations, the result 420 may indicate the success of the validation case 410, which means the changed network works fine and everything is as expected.

In some implementations, the result 420 may indicate that the changed network does not work as expect. In this case, the controller 830 may send an alert associated with trigger event 140 to an administrator device 430. In some implementations, the alert may be first sent to a mobile terminal such as a cellphone to the administrator. After the alert is received, the administrator may solve such problems prior to this problem coming to a big crashing, and also prevent this problem from user's perception.

Some other implementations relating to handling the process flow against each type of trigger events may be referred to FIG. 6, and the present disclosure will not discuss these implementations for simplification herein. It is understood that device 800 may archive one or more above mentioned advantages as described with respect to the method 500. For example, the device 800 can validate whether the network change takes effect in the network automatically, and can improve the validation efficiency of the network changes. For another example, the device 800 can save the cost of deployment of dedicated sensors for validation.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method, comprising:
   detecting, by a controller, a trigger event for validating a network including a plurality of access points (APs), the trigger event being associated with at least one of a configuration change, a firmware upgrade, or a topology change of the network;
   identifying, by the controller, an AP of the plurality of APs associated with the trigger event;
   selecting, by the controller, a target AP for validating the network from the plurality of APs based on a neighbor table of the AP associated with the detected trigger event, the selection of the target AP being based on one of a neighboring AP nearest to the AP associated with the detected trigger event and a neighboring AP having a smallest workload;
   determining, by the controller, a validation case corresponding to the detected trigger event from a knowledge base, the knowledge base storing a plurality of validation cases corresponding to a plurality of trigger events;
   sending, by the controller, the validation case to the target AP; and
   in response to the validation case being performed, receiving by the controller from the target AP, a result of performance of the validation case.

2. The method according to claim 1, wherein the validation case is performed by the target AP to validate a function of the AP associated with the detected trigger event, and the method further comprises:
   determining, by the controller, whether the detected trigger event takes effect in the network based on the result of performance of the validation case.

3. The method according to claim 2, further comprising:
   in response to a determination that the detected trigger event does not take effect in the network, sending, by the controller, an alert associated with the detected trigger event to an administrator device.

4. The method according to claim 1, wherein determining the validation case corresponding to the detected trigger event from the knowledge base comprises:
   sending, by the controller to the knowledge base, a query to the detected trigger event;
   receiving, by the controller from the knowledge base, a response to the query, the response including a suite of validation cases corresponding to the detected trigger event; and
   determining, by the controller, the suite of validation cases based on the response to the query.

5. The method according to claim 1, wherein selecting the target AP from the plurality of APs based on the neighbor table of an AP associated with the detected trigger event comprises:
   obtaining, by the controller, the neighbor table of the AP associated with the detected trigger event; and
   selecting, by the controller and based on the neighbor table, one of the followings as the target AP:
      a nearest AP to the AP associated with the detected trigger event, or
      a neighbor AP with the least workload in a plurality of neighbor APs of the AP associated with the detected trigger event.

6. The method according to claim 1, wherein determining the validation case corresponding to the detected trigger event from the knowledge base comprises:
   in response to the detected trigger event being the configuration change, determining, by the controller, one or more functions of the network affected by the configuration change; and
   obtaining, by the controller, the validation case for validating the one or more functions of the network.

7. The method according to claim 6, wherein the configuration change is a service set identifier (SSID) change, and sending the validation case to the target AP comprises:
   causing the target AP to set up a Wi-Fi station virtual AP (VAP) for connecting to a neighbor basic SSID (BSSID); and
   causing the target AP to generate traffic for validating a function of the neighbor BSSID.

8. The method according to claim 6, wherein the configuration change is an internet of things (IoT) beacon change, and sending the validation case to the target AP comprises:
   causing the target AP to check a heard IoT beacon; and
   causing the target AP to validate a payload of the heard IoT beacon.

9. The method according to claim 1, wherein determining the validation case corresponding to the detected trigger event from the knowledge base comprises:
   in response to the detected trigger event being the firmware upgrade, obtaining, by the controller, a patch list of the firmware upgrade;
   determining, by the controller, an upgraded AP in the network and the validation case according to the patch list for validating one or more functions of the upgraded AP.

10. The method according to claim 1, wherein determining the validation case corresponding to the detected trigger event from the knowledge base comprises:
    in response to the detected trigger event being the topology change, determining, by the controller, one or more APs affected by the topology change and the validation case for validating one or more functions of the one or more APs.

11. A device, comprising:
    at least one processor; and
    a memory coupled to the at least one processor, the memory storing a controller comprising instructions to cause the at least one processor to:
       detect a trigger event for validating a network including a plurality of access points (APs), the trigger event being associated with at least one of a configuration change, a firmware upgrade, or a topology change of the network;
       identify an AP of the plurality of APs associated with the trigger event;

select a target AP for validating the network from the plurality of APs based on a neighbor table of the AP associated with the detected trigger event, the selection of the target AP being based on one of a neighboring AP nearest to the AP associated with the detected trigger event and a neighboring AP having a smallest workload;

determine a validation case corresponding to the detected trigger event from a knowledge base, the knowledge base storing a plurality of validation cases corresponding to a plurality of trigger events;

send the validation case to the target AP; and in response to the validation case being performed, receive, from the target AP, a result of performance of the validation case.

12. The device according to claim 11, wherein the validation case is performed by the target AP to validate a function of the AP associated with the detected trigger event, and the controller further comprises instructions to cause the at least one processor to:

determine whether the detected trigger event takes effect in the network based on the result of performance of the validation case.

13. The device according to claim 12, wherein the controller further comprises instructions to cause the at least one processor to:

in response to a determination that the detected trigger event does not take effect in the network, send an alert associated with the detected trigger event to an administrator device.

14. The device according to claim 11, wherein the instructions to determine the validation case corresponding to the detected trigger event from the knowledge base comprise instructions to cause the at least one processor to:

send, to the knowledge base, a query to the detected trigger event;

receive, from the knowledge base, a response to the query, the response including a suite of validation cases corresponding to the detected trigger event; and determine the suite of validation cases based on the response to the query.

15. The device according to claim 11, wherein the instructions to select the target AP from the plurality of APs based on the neighbor table of an AP associated with the detected trigger event comprise instructions to cause the at least one processor to:

obtain the neighbor table of the AP associated with the detected trigger event; and select, based on the neighbor table, one of the followings as the target AP:

a nearest AP to the AP associated with the detected trigger event, or a neighbor AP with the least workload in a plurality of neighbor APs of the AP associated with the detected trigger event.

16. The device according to claim 11, wherein the instructions to determine the validation case corresponding to the detected trigger event from the knowledge base comprise instructions to cause the at least one processor to:

in response to the detected trigger event being the configuration change, determine one or more functions of the network affected by the configuration change; and obtain the validation case for validating the one or more functions of the network.

17. The device according to claim 16, wherein the configuration change is a service set identifier (SSID) change, the instructions to send the validation case to the target AP comprise instructions to cause the at least one processor to:

cause the target AP to set up a Wi-Fi station virtual AP (VAP) for connecting to a neighbor basic SSID (BSSID); and cause the target AP to generate traffic for validating a function of the neighbor BSSID.

18. The device according to claim 16, wherein the configuration change is an internet of things (IoT) beacon change and the instructions to send the validation case to the target AP comprise instructions to cause the at least one processor to:

cause the target AP to check a heard IoT beacon; and cause the target AP to validate a payload of the heard IoT beacon.

19. The device according to claim 11, wherein the instructions to determine the validation case corresponding to the detected trigger event from the knowledge base comprise instructions to cause the at least one processor to:

in response to the detected trigger event being the firmware upgrade, obtain a patch list of the firmware upgrade;

determine an upgraded AP in the network and the validation case according to the patch list for validating one or more functions of the upgraded AP.

20. A non-transitory computer-readable medium comprising instructions stored thereon which, when executed by a processor, cause the processor to:

detect a trigger event for validating a network including a plurality of access points (APs), the trigger event being associated with at least one of a configuration change, a firmware upgrade, or a topology change of the network;

identify an AP of the plurality of APs associated with the trigger event;

select a target AP from the plurality of APs based on a neighbor table of an AP associated with the detected trigger event, the selection of the target AP being based on one of a neighboring AP nearest to the AP associated with the detected trigger event and a neighboring AP having a smallest workload;

determine a validation case corresponding to the detected trigger event from a knowledge base, the knowledge base storing a plurality of validation cases corresponding to a plurality of trigger events;

send the validation case to the target AP; and in response to the validation case being performed, receive, from the target AP, a result of performance of the validation case.

* * * * *